(12) United States Patent
Peng et al.

(10) Patent No.: US 7,513,668 B1
(45) Date of Patent: Apr. 7, 2009

(54) ILLUMINATION SYSTEM FOR A HEAD UP DISPLAY

(75) Inventors: Guolin Peng, Cedar Rapids, IA (US); Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 187 days.

(21) Appl. No.: 11/196,999

(22) Filed: Aug. 4, 2005

(51) Int. Cl.
*F21V 7/04* (2006.01)

(52) U.S. Cl. .......................... 362/600; 362/26; 362/27; 362/607; 362/612; 362/618

(58) Field of Classification Search ................ 362/600, 362/26, 27, 607, 612, 613, 618, 227, 235, 362/246; 348/115; 359/630, 599, 565, 742; 345/7–9, 204, 690–694; 349/61–65
See application file for complete search history.

(56) References Cited

U.S. PATENT DOCUMENTS

| | | | |
|---|---|---|---|
| 4,218,111 A | 8/1980 | Withrington | |
| 4,900,133 A | 2/1990 | Berman | |
| 4,968,117 A | 11/1990 | Chern | |
| 5,014,167 A * | 5/1991 | Roberts | 362/494 |
| 5,436,763 A | 7/1995 | Chen | |
| 5,808,800 A * | 9/1998 | Handschy et al. | 359/630 |
| 5,907,416 A | 5/1999 | Hegg | |
| 6,088,165 A | 7/2000 | Janeczko | |
| 6,161,940 A * | 12/2000 | Choate et al. | 362/235 |
| 6,236,511 B1 | 5/2001 | Brown | |
| 6,356,393 B1 * | 3/2002 | Potin et al. | 359/631 |
| 6,567,014 B1 | 5/2003 | Hansen | |
| 6,682,211 B2 * | 1/2004 | English et al. | 362/545 |
| 6,789,901 B1 * | 9/2004 | Kormos | 353/13 |
| 6,801,362 B1 | 10/2004 | Brown | |
| 6,926,435 B2 * | 8/2005 | Li | 362/555 |
| 7,002,546 B1 * | 2/2006 | Stuppi et al. | 345/102 |
| 7,052,152 B2 * | 5/2006 | Harbers et al. | 362/30 |
| 7,206,133 B2 * | 4/2007 | Cassarly et al. | 359/630 |
| 2005/0024749 A1 | 2/2005 | Nanba | |
| 2005/0265051 A1 * | 12/2005 | Yamamoto et al. | 362/657 |
| 2006/0191177 A1 * | 8/2006 | Engel | 40/453 |

OTHER PUBLICATIONS

Organic LED Displays (OLEDS)—The Next Trend? Audioholics.com Online A/V Magazine, Apr. 17, 2005, pp. 1-4.
Hideyo Ohtsuki, "18.1-inch XGA TFT-LCD with Wide Color Reproduction Using High Power LED-Backlighting", SID '02 Digest', pp. 1154-1157.

* cited by examiner

*Primary Examiner*—Sandra L O'Shea
*Assistant Examiner*—Mark Tsidulko

(57) ABSTRACT

An illumination system for use in illuminating a spatial light modulator for a head up display system. The illumination system includes a high power light emitting diode (LED) array assembly; and, a Fresnel lens array operatively associated with the LED array assembly for receiving light produced by the LED and providing a nearly collimated light output for use by the spatial light modulator. Utilization of the ultra bright LED array and Fresnel lens array provides the capability of the illumination source to be made very thin, light weight, and efficient. The Fresnel lens array, which converges the light to be nearly collimated, enhances the harvest of the available flux thus increasing the system efficiency and providing a system that gives the illusion of having an image at infinity. Additional components such as holographic elements, optical compensation films, and brightness enhancement films can be used to tailor the light if required.

18 Claims, 3 Drawing Sheets

FIG. 1
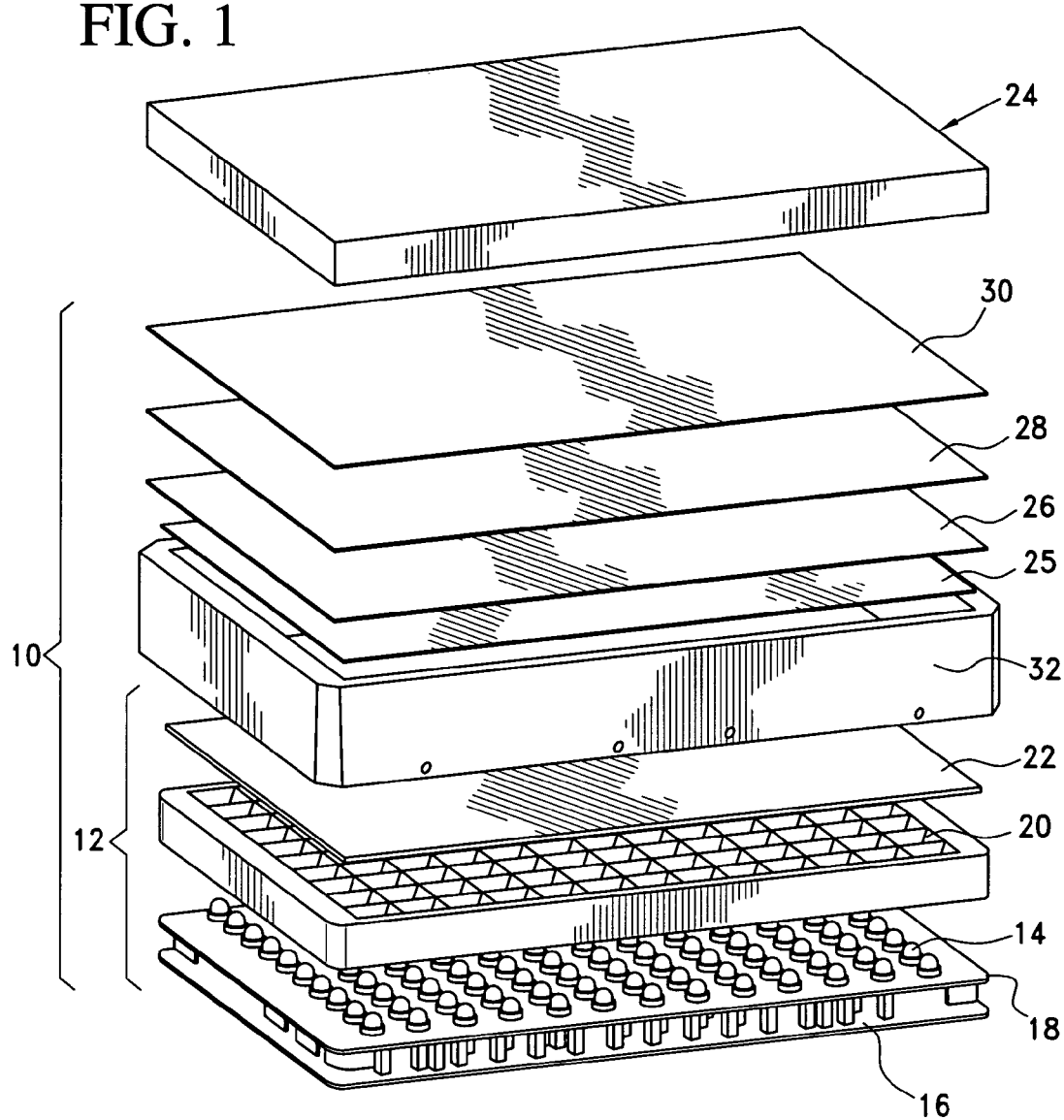
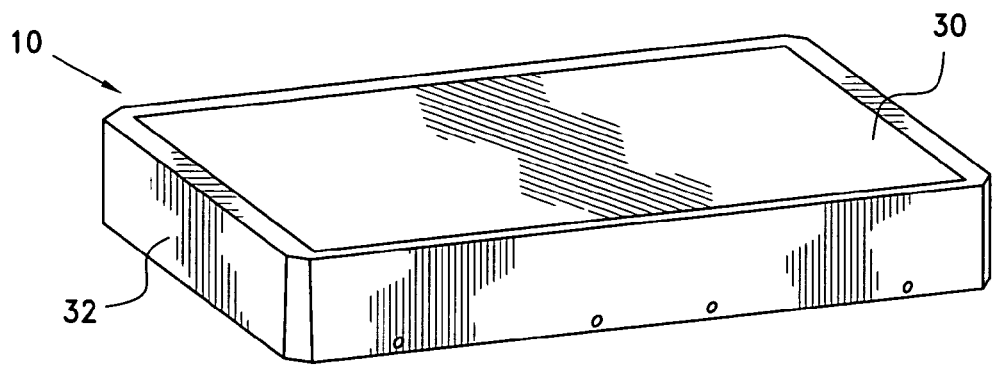
FIG. 2

ILLUMINATION SYSTEM FOR A HEAD UP DISPLAY

BACKGROUND OF THE INVENTION

1. Field of the Invention

The present invention relates to display systems and more particularly to an illumination system particularly adapted for use in illuminating a spatial light modulator for a head up display system.

2. Description of the Related Art

A Head Up Display (HUD) is a means of projecting information directly into a human's visual field. The HUD was pioneered for military aviation and has since been used in other applications. HUDs are typically used in aircraft to provide pilots with information superimposed onto their forward field of view through the aircraft windshield. The information displayed may be data or symbolic images indicative of flight conditions such as the operating condition of the aircraft, environmental information or guidance information for use in directing the aircraft to its destination. These images are presented in overlying fashion on the pilot's field of view so as not to interfere with the pilot's view of the background scene.

The HUDs that exist today have problems relative to volume, cost, mechanical constraints, and high ambient contrast. Typical overhead mounted HUD systems of today consist of cathode-ray tubes (CRTs), projecting onto a combiner via a series of large and complex lenses. Military HUDs are typically mounted behind the forward cockpit displays. Again, they typically consist of CRTs and a series of large lenses with a turning mirror employed in order to project onto the see-through combiner.

An example of an image source for an HUD is described in U.S. Pat. No. 5,436,763, issued to C. W. Chen et al, entitled "Wide Spectral Bandwidth Virtual Image Display Optical System". The '763 patent discloses a vertical image display optical system that uses a CRT in combination with a relay lens group to present an image to a combiner. The relay lens group includes a number of optical elements. U.S. Pat. No. 6,236,511, issued to R. D. Brown, entitled "Beam Combining Optical Element", discloses the use of an image source that is typically a cathode-ray tube that emits an image that includes a green component carried by multiple wavelengths of light within the range of approximately 540-560 nanometers (nm). Both of these patents illustrate the inherent bulkiness of the image sources in prior art HUD systems.

SUMMARY OF THE INVENTION

In a broad aspect, the present invention is an illumination system for use in illuminating a spatial light modulator for a head up display system. The illumination system includes a high power light emitting diode (LED) array assembly; and, a Fresnel lens array operatively associated with the LED array assembly for receiving light produced by the LED and providing a nearly collimated light output for use by the spatial light modulator.

Utilization of the ultra bright LED array and Fresnel lens array provides the capability of the illumination source to be made very thin, light weight, and efficient. The Fresnel lens array, which converges the light to be nearly collimated enhances the harvest of the available flux thus increasing the system efficiency and providing a system that gives the illusion of having an image at infinity. Additional components such as holographic elements, optical compensation films, and brightness enhancement films can be used to tailor the light if required.

Although particularly adapted for use with a head up display system the illumination system can be utilized for a direct view LCD display system. Furthermore, although a Fresnel lens array is preferably utilized, this component may optionally be substituted with a collimating lens.

BRIEF DESCRIPTION OF THE DRAWINGS

FIG. 1 is an exploded perspective view of a preferred embodiment of the illumination system of the present invention, shown in relation to an LCD.

FIG. 2 is a perspective view of the assembled illumination system of FIG. 1.

The same elements or parts throughout the figures of the drawings are designated by the same reference characters.

DETAILED DESCRIPTION OF THE INVENTION

Figure 3:
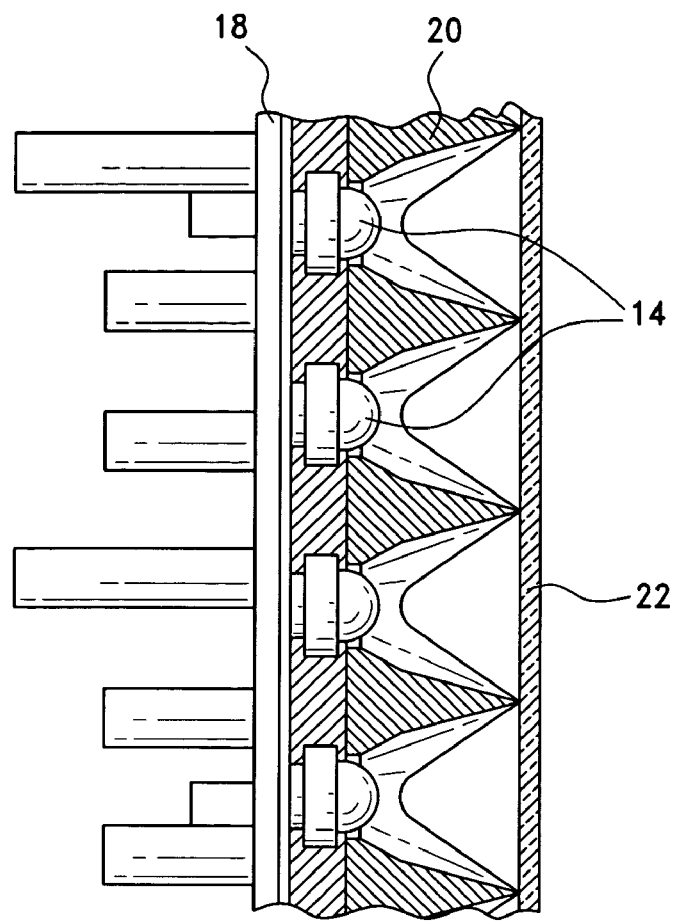
FIG. 3 is a cross-sectional view of the illumination system of FIG. 1.

Referring now to the drawings and the characters of reference marked thereon, FIGS. 1-3 illustrate a preferred embodiment of the illumination system of the present invention, designated generally as 10. The illumination system 10 includes a high power light emitting diode (LED) array assembly, designated generally as 12. The LED array assembly 12 includes LEDs 14 that are "high power". In the context of this patent this refers to LED's each having a luminous output of greater than 15 lumens and preferably greater than 20 lumens. In a preferred embodiment each LED has an output of about 36 lumens. (Green LEDs are the most typical for HUD use.)

The LED array assembly 12 includes suitable driving electronic circuitry 16 for powering the LEDs 14 and an LED heat sink 18, as is well known in this field. Furthermore, a suitable LED light baffle 20 is utilized as is also well known in this field. Such a light baffle 20 is typically aluminum but could also be manufactured from almost any metallic or plastic material and then may be painted with reflective paint if the material is not already reflective. In applicant's present application for use with a compact HUD a 10×13 LED array is utilized. It may be, for example, a Lumen™ emitter.

A Fresnel lens array 22 is operatively associated with the LED array for receiving light produced by the LED and providing a nearly collimated light output for use by a spatial light modulator 24. The Fresnel lens array should be consistent in size with the LED array assembly 12. A Fresnel lens may have the following description including approximate ranges, shown along with present applicant's preferred Fresnel lens array designed for this compact HUD application:

Focal length: 0.1-3.0 inches, preferably about 0.67 in
  Lenslet spacing: 0.25-5.0 inches, preferably about 0.6 in
  Grooves per inch: 10-500, preferably about 125
  Thickness: 0.01-0.3 inches, preferably about 0.06 inches
  Array size: 1 inch×1 inch-72 inches×72 inches, preferably about 6 inches×7.8 inches Overall size: 1 inch×1 inch-72 inches×72 inches, preferably about 6.4 inches×8.6 inches Conjugate: groove—infinite, flat—0.01-3.0, preferably about 0.67

Lenslet edge Error: <500 µm, preferably <100 µm

A diffuser 25 is positioned to receive light from the Fresnel lens array. The diffuser 25 may be, for example, a holographic diffuser (i.e. holographic light shaping diffuser (HLSD)) or bulk scattering diffuser. For the HUD application discussed above, the diffuser angle may be less than 20 degrees.

At least one brightness enhancement film (BEF) 26, 28 is preferably used to receive the light from the diffuser 25. Such prismatic BEFs are commercially available from companies such as 3M Company, St. Paul Minn. that markets BEFs under the trademark Vikuiti™. A dual enhancement filter, DBEF, may be utilized.

An image directing film (IDF) 30, typically a transparent optical composite prismatic film, redirects the output image of the BEF 28, to the optimum viewing angle. IDFs are manufactured by 3M Company under the trademark Vikuiti™ and by Physical Optics Corp., Torrance, Calif.

The image from the IDF 30 is finally directed to the spatial light modulator 24. The spatial light modulator 24 may be an LCD, preferably a TFT (thin film transistor) (i.e. active-matrix) LCD. Although particularly adaptable for use with a HUD, the illumination system of the present invention can be utilized with a direct view LCD such as, for example, a laptop computer or desktop computer flat panel.

The illumination system 10 is typically housed in a metal frame 32 but could be manufactured from any applicable material such as metal or plastic.

Although the invention has been preferably described as having diffusers, BEFs and IDFs some or none of these components may not be essential to the invention. They are utilized in accordance with the design parameters and desired performance of the system. If the optical performance gains are viewed as providing only marginal improvement for a given set of specifications these optical elements may or may not be included in the design.

Figure 4:
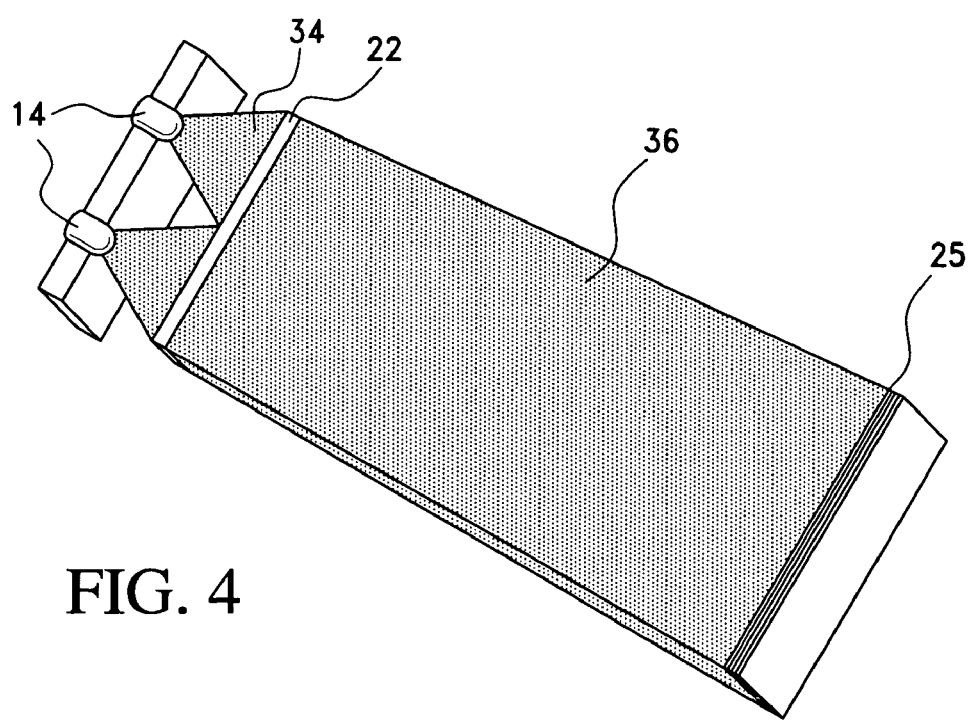
FIG. 4 is a schematic view of the light output from two LEDs, illustrating the collimation of the light and its passage through the illumination system.

Referring now to FIG. 4 the light emission path for two LEDs in the LED array 14 is illustrated. It can be seen that each of two LEDs emits light that is maintained substantially conical (numeral designation 34) by the light baffle 20. Upon passing through the Fresnel lens array 22 the light is nearly collimated, as shown by numeral designation 36.

Figure 5A:
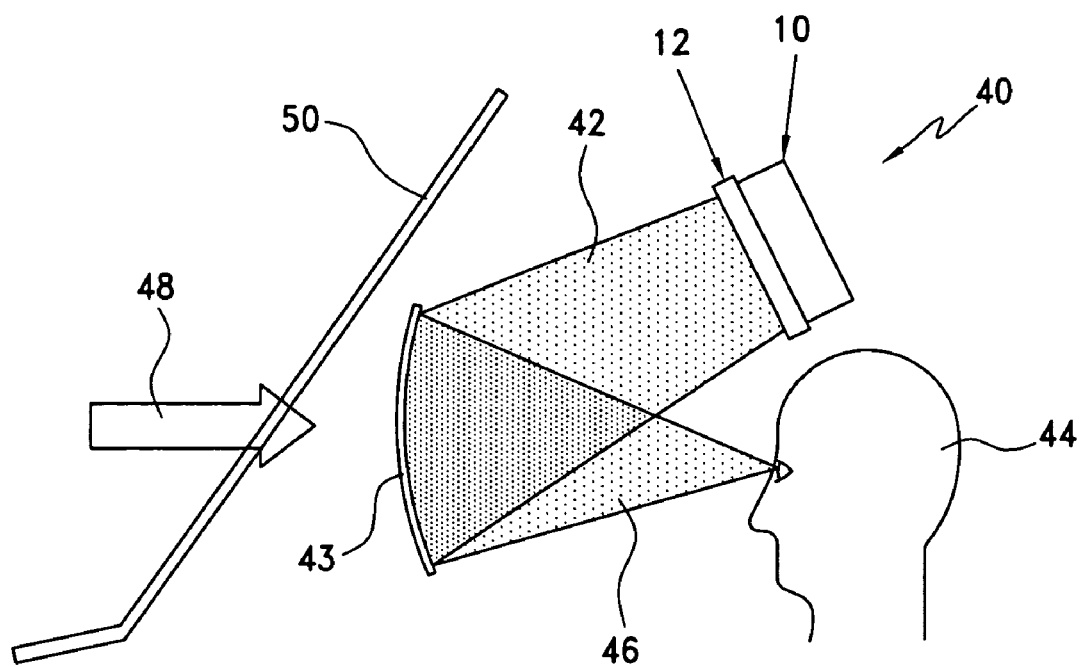
FIG. 5A shows utilization of the present invention in an overhead mounted HUD.
Figure 5B:
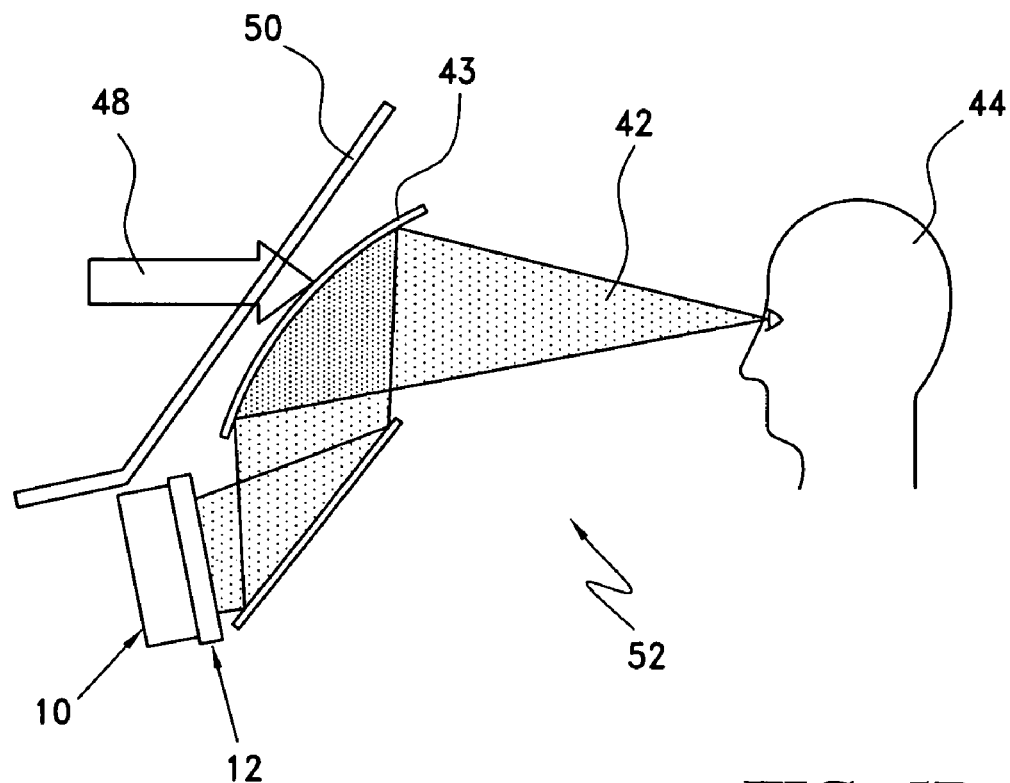
FIG. 5B shows utilization of the present invention in an in-dash mounted HUD.

Implementation of the present invention with a HUD is illustrated in FIGS. 5A and 5B. FIG. 5A illustrates the utilization of the illumination system 10 and LCD 12 in an overhead mounted HUD, designated generally as 40. The illuminated light output 42 from the LCD 12 is directed to a beam combination mirror (BCM) 43. The BCM 43 may be positioned so that the observer 44, in a line of sight 46, may see a visual exterior view of an outside scene 48 through the BCM 42 and the projected image 42 in the BCM 42. The windshield is designated 50.

According to the present invention, the image source 10, 12 may be located at any angle relative to the line of sight 42 of the observer 44. For example, the image source 10, 12 may be located above the line of sight as illustrated in FIG. 5A, or below the line of sight, as shown in FIG. 5B. FIG. 5B illustrates the utilization of the illumination system 10 and LCD 12 in an in-dash mounted HUD, designated generally as 52. This way, flexibility in terms of relative positions between the combiner 43 and the image source may be provided, thereby leading to a great convenience when placing the optical display system in a crowded place (e.g., an airplane cockpit, a combat tank, or the like). The optical display system may allow wide viewing angles to enable at least one of cross-cockpit viewing or crosschecking of the projected image in the beam combination mirror (BCM) 43.

Other embodiments and configurations may be devised without departing from the spirit of the invention and the scope of the appended claims. For example, instead of utilizing a Fresnel lens a collimating lens may be used for providing a nearly collimated light output for use by the spatial light modulator. In such an instance, the collimating lens may, for example, be molded into the plastic case of the LED array assembly.

Although the present invention has been described with respect to the use of a combiner that comprises a beam combination mirror (BCM), it can be utilized with a variety of other types of combiners. For example, it can be used with a curved beam combination mirror (CBCM). U.S. Ser. No. 10/951,295, filed Sep. 27, 2004, entitled "Compact Head Up Display With Wide Viewing Angle", by co-applicants, G. Peng and M. J. Steffensmeier, and assigned to the present assignee, discloses the use of such BCM's and CBCM's in an optical display system. Patent application Ser. No. 10/951,295 is incorporated by reference herein in its entirety.

In a preferred embodiment of a HUD the illumination system of the present invention is utilized with a meniscus combiner. U.S. Ser. No. 11/196,904, entitled, "Meniscus Head Up Display Combiner", filed concurrently herewith, by co-applicants, G. Peng and M. J. Steffensmeier, and assigned to the present assignee, discloses a meniscus combiner that includes a meniscus lens; a multi-layer dichroic coating formed on a first surface of the meniscus lens; and, an anti-reflection coating formed on a second, opposite surface of the meniscus lens. This co-filed patent application is incorporated by reference herein in its entirety.

The HUD in which this illumination system may be incorporated in may be foldable up into or adjacent to a cockpit ceiling of an aircraft. Or, it may be positionable behind a dashboard of an aircraft. U.S. Ser. No. 11/197,006, entitled, "Advanced Compact head Up Display", filed concurrently herewith, by co-applicants, G. Peng and M. J. Steffensmeier, and assigned to the present assignee, discloses a HUD display system including these features. This co-filed patent application is incorporated by reference herein in its entirety. This provides a head-motion-box having dimensions greater than about 3 inches horizontal, 2 inches in vertical, and 4 inches in depth. (The head-motion-box defines a volume within which at least part of the HUD image information can be viewable.) Alternative combiners may include, for example, doublet lens, or combiners coated surfaces which are spherical, toric, aspherical, or asymmetric aspheric.

The invention claimed is:

1. An illumination system for use in illuminating a spatial light modulator for a head up display system, comprising:
   a) a high power light emitting diode (LED) array assembly, comprising:
      a plurality of LEDs, said LEDs each generally having a luminous output of greater than 15 lumens;
      an LED light heat sink operatively positioned relative to said plurality of LEDs; and,
      an LED light baffle operatively positioned relative to said plurality of LEDs;
   b) a Fresnel lens array operatively associated with said LED array assembly for receiving light produced by said LED array assembly and providing a nearly collimated light output for use by a spatial light modulator, said LED light baffle positioned between said plurality of LEDs and said Fresnel lens array;

c) a diffuser positioned to receive light from said Fresnel lens array prior to being received by the spatial light modulator;

d) at least one brightness enhancement film (BEF) positioned to receive light from said Fresnel lens array prior to being received by the spatial light modulator; and, e) an image directing film (IDF) positioned to receive light from said Fresnel lens array prior to being received by a spatial light modulator, wherein an image is formed at optical infinity.

2. The illumination system of claim 1, wherein said spatial light modulator comprises an active matrix liquid crystal display (AMLCD).

3. The illumination system of claim 1, wherein said LED array assembly comprises a plurality of LEDs, each LED having a luminous output of greater than 20 lumens.

4. The illumination system of claim 1, wherein said LED array assembly comprises a plurality of LEDs, each LED having a luminous output of about 36 lumens.

5. The illumination system of claim 1, wherein said diffuser is selected from the group consisting of holographic diffusers and bulk scattering diffusers.

6. The illumination system of claim 1, wherein said at least one brightness enhancement film (BEF) comprises a single BEF.

7. The illumination system of claim 1, wherein said at least one BEF comprises a plurality of brightness enhancement films (BEF).

8. An illumination system for use in illuminating a spatial light modulator for a direct view LCD display system, comprising:

a) a high power light emitting diode (LED) array assembly, comprising:
  a plurality of LEDs, said LEDs each generally having a luminous output of greater than 15 lumens;
  an LED light heat sink operatively positioned relative to said plurality of LEDs; and,
  an LED light baffle operatively positioned relative to said plurality of LEDs;

b) a Fresnel lens array operatively associated with said LED array assembly for receiving light produced by said LED array assembly and providing a nearly collimated light output for use by a spatial light modulator, said LED light baffle positioned between said plurality of LEDs and said Fresnel lens array;

c) a diffuser positioned to receive light from said Fresnel lens array prior to being received by the spatial light modulator;

d) at least one brightness enhancement film (BEF) positioned to receive light from said Fresnel lens array prior to being received by the spatial light modulator; and, e) an image directing film (IDF) positioned to receive light from said Fresnel lens array prior to being received by a spatial light modulator, wherein an image is formed at optical infinity.

9. An optical display system, comprising:
an illumination system, comprising:
  a high power light emitting diode (LED) array assembly, comprising:
    a plurality of LEDs, said LEDs each generally having a luminous output of greater than 15 lumens;
    an LED light heat sink operatively positioned relative to said plurality of LEDs; and,
    an LED light baffle operatively positioned relative to said plurality of LEDs; and, a Fresnel lens array operatively associated with said LED array assembly for receiving light produced by said LED and providing a nearly collimated light output;

a spatial light modulator for receiving said nearly collimated light output, said spatial light modulator comprising an active matrix liquid crystal display (AMLCD);

a combiner operatively associated with said spatial light modulator for receiving a transmitted output from aid spatial light modulator for observation by a viewer in combination with an observer's visual exterior view of an outside scene;

a diffuser positioned to receive light from said Fresnel lens array prior to being received by the spatial light modulator;

at least one brightness enhancement film (BEF) positioned to receive light from said Fresnel lens array prior to being received by the spatial light modulator; and, an image directing film (IDF) positioned to receive light from said Fresnel lens array prior to being received by a spatial light modulator.

10. The illumination system of claim 9, wherein said LED array assembly comprises a plurality of LEDs, each LED having a luminous output of greater than 20 lumens.

11. An illumination system for use in illuminating a spatial light modulator for a head up display system, comprising:
  a high power light emitting diode (LED) array assembly, comprising:
    a plurality of LEDs, said LEDs each generally having a luminous output of greater than 15 lumens;
    an LED light heat sink operatively positioned relative to said plurality of LEDs; and,
    an LED light baffle operatively positioned relative to said plurality of LEDs,
    said LED array assembly further including a collimating lens for providing a nearly collimated light output for use by a spatial light modulator;
  a diffusers positioned to receive light from said collimating lens prior to being received by the spatial light modulator;
  at least one brightness enhancement film (BEF) positioned to receive light from said collimating lens prior to being received by the spatial light modulator; and,
  an image directing film (IDF) positioned to receive light from said Fresnel lens array prior to being received by a spatial light modulator,
  wherein an image is formed at optical infinity.

12. The illumination system of claim 11, wherein said spatial light modulator comprises an active matrix liquid crystal display (AMLCD).

13. The illumination system of claim 11, wherein said LED array assembly comprises a plurality of LEDs, each LED having a luminous output of greater than 20 lumens.

14. The illumination system of claim 11, wherein said LED array assembly comprises a plurality of LEDs, each LED having a luminous output of about 36 lumens.

15. The illumination system of claim 11, wherein said diffuser is selected from the group consisting of holographic diffusers and bulk scattering diffusers.

16. The illumination system of claim 11, wherein said at least one brightness enhancement film (BEF) comprises a single BEF.

17. The illumination system of claim 11, wherein said at least one BEF comprises a plurality of brightness enhancement films (BEF).

18. An illumination system for use in illuminating a spatial light modulator for a direct view LCD displays system, comprising:

a high power light emitting diode (LED) array assembly, comprising:

a plurality of LEDs, said LEDs each generally having a luminous output of greater than 15 lumens;

an LED light heat sink operatively positioned relative to said plurality of LEDs; and, an LED light baffle operatively positioned relative to said plurality of LEDs, said LED array assembly further including a collimating lens for providing a nearly collimated light output for use by a spatial light modulator;

a diffuser positioned to receive light form said collimating lens prior to being received by the spatial light modulator;

at least one brightness enhancement film (BEF) positioned to receive light from said collimating lens prior to being received by the spatial light modulator; and, an image directing film (IDF) positioned to receive light from said Fresnel lens array prior to being received by a spatial light modulator, wherein an image is formed at optical infinity.

\* \* \* \* \*